July 1, 1924.

C. O. DEEMS

DRAFT CONNECTION

Filed Nov. 18, 1922

Inventor
Clarence O. Deems
William C. Linton
Attorney

July 1, 1924.
C. O. DEEMS
DRAFT CONNECTION
Filed Nov. 18, 1922
1,499,859
2 Sheets-Sheet 2
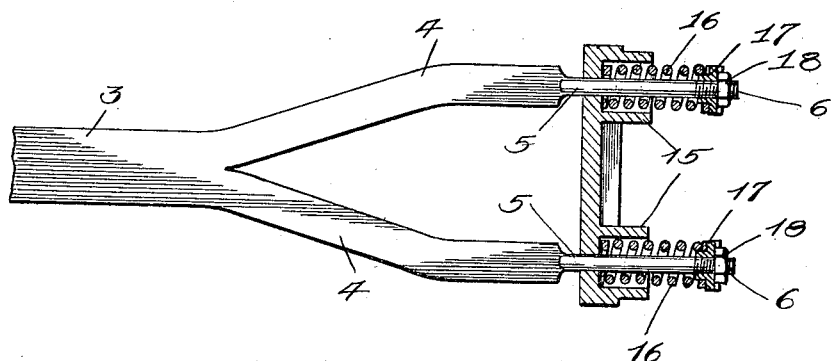
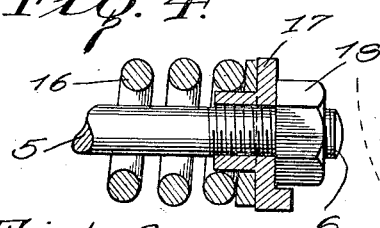
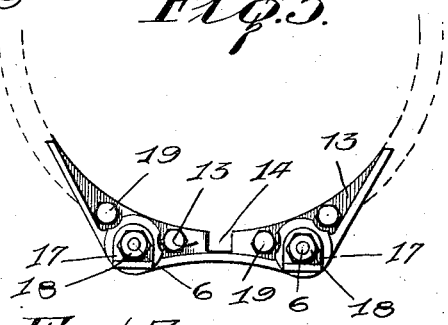
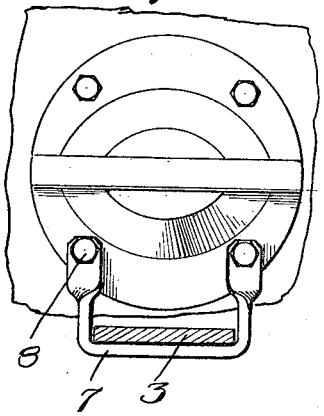
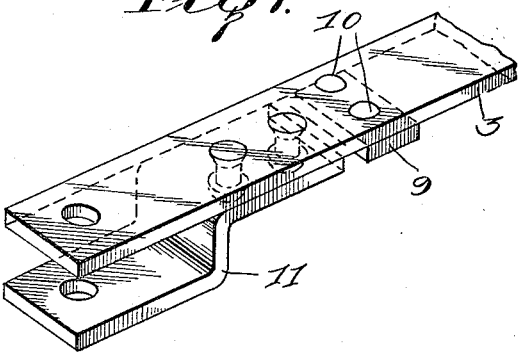
Inventor
Clarence O. Deems
William C. Linton.
Attorney Patented July 1, 1924.

1,499,859

UNITED STATES PATENT OFFICE.

CLARENCE O. DEEMS, OF SAN ANTONIO, TEXAS.

DRAFT CONNECTION.

Application filed November 18, 1922. Serial No. 601,843.

*To all whom it may concern:*

Be it known that I, CLARENCE O. DEEMS, a citizen of the United States of America, residing at San Antonio, in the county of Bexar and State of Texas, have invented certain new and useful Improvements in Draft Connections; and I do hereby declare that the following is a full, clear, concise, and exact description of the invention, such as will enable others skilled in the art to which it appertains to make and use the same.

This invention relates to improvements in tractor draft connections, particularly to that type of draft connection described and claimed in my prior United States Patent Number 1,408,081, and has for one of its objects to provide an improvement thereover by constructing and arranging the same in a manner whereby a direct line of draft from the point of connection of the draft bar of the device with the motor crank casing to the load connected to its opposite end will be had, together with the lowering of such line of draft with relation to the center of gravity of the tractor in order that its tractive efficiency will be increased.

Another and equally important object of the invention is to provide a novel mode of connection between the inner end of the draft bar and the tractor crank casing, causing the application of stress or load to said casing to be equalized through the connection and thus, enhance durability as well as practicability of the device.

It is likewise an object of the invention to provide the draft bar connected with a coupling plate so formed as to permit its connection to the tractor motor crank casing without alteration to the same, means being included for slidably retaining the bifurcated portions of the adjustable spring seated ends of the draft bar.

Other objects will be in part obvious and in part pointed out hereinafter.

In order that the invention and its mode of operation may be readily understood by persons skilled in the art, I have in the accompanying illustrative drawings, and in the detailed following description based thereon, disclosed one embodiment of the same.

In these drawings:

Figure 3 is an enlarged fragmentary detail in plan of the bifurcated inner extremity of the draft bar showing the manner in which the same is engaged with the coupling plate, the latter being shown in section;

Figure 4 is an enlarged fragmentary detail, partly in section, showing the manner in which one of the bifurcated extremities of the draft is engaged with the coupling plate;

Figure 5 is an end elevation of the improved draft connection;

Figure 6 is an enlarged fragmentary detail in transverse section showing the mounting of the rearward portion of the draft bar; and, Figure 7 is an enlarged fragmentary detail in perspective of the rearward end of the draft bar.

Having more particular reference to the drawings, in connection with which like characters of reference will designate corresponding parts throughout, the improved draft bar is especially advantageous for use upon the well known "Fordson" design of motor tractor, T representing the tractor in its entirety, while the numerals 1 and 2 designate the general showing of the motor crank casing and the power transmission casing, respectively.

Figure 1:
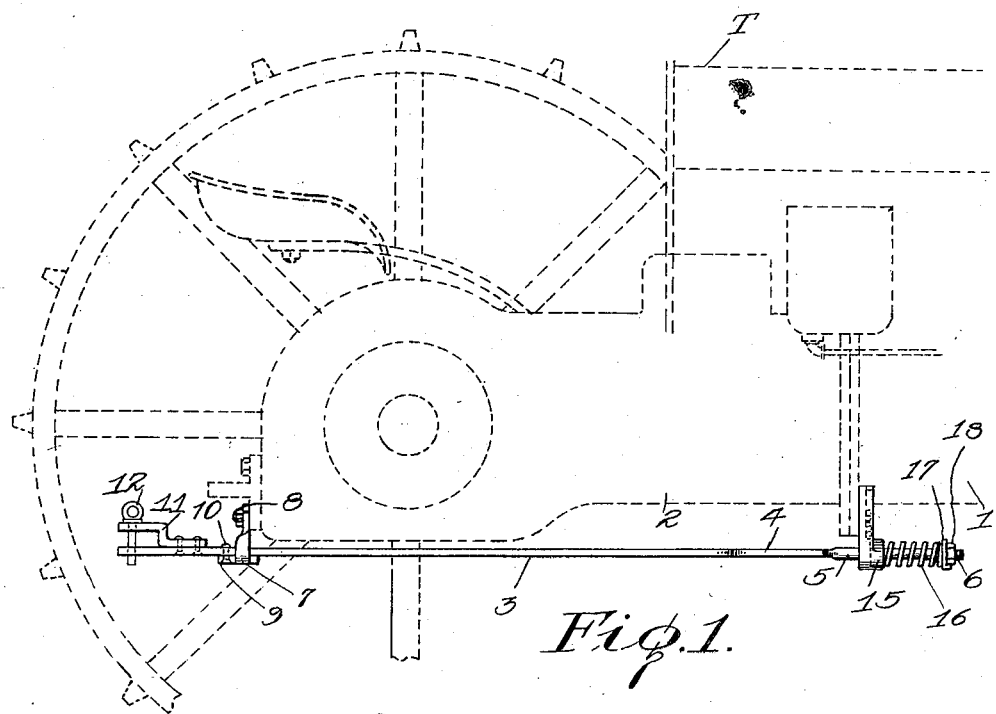
Figure 1 is a side elevation of the improved draft connection showing its connection with a well known design of tractor.
Figure 2:
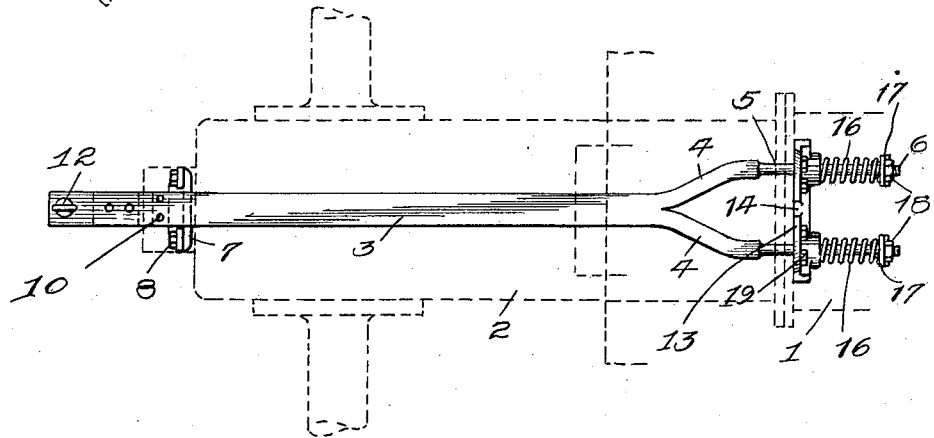
Figure 2 is a top plan view of the same.

The improved draft connection may be stated to comprise a draft bar 3 disposed longitudinally of the under side of the transmission casing 2 as clearly shown in the Figure 2, having its forward or inner end forked or bifurcated as at 4, the extremities of which are circular in cross section or cylindrical as shown at 5 and have their outer ends screw threaded as at 6.

The rearward portion of the draft bar 3 is movably supported upon a substantially U-shaped bracket arm 7 having its opposite extremities turned or twisted whereby to provide effectual means for connecting the same to a portion of the tractor through the medium of bolts indicated at 8. A drop plate 9 is arranged transversely of the rearward end portion of the draft bar 3 as shown in the Figure 7, and is secured to the same through the medium of rivets or similar fastening devices 10, the location of said plate 9 being such as it will be arranged adjacent the rearward marginal portion of the U-shaped bracket 7 and in consequence, will ensure proper longitudinal positioning of the forward end of the draft bar and its connection with the tractor motor crank casing in a manner hereinafter more fully described.

To facilitate connection of the rearward or outer end of the draft bar 3 to a load to be drawn by the tractor, an angle arm or clip 11 is secured to the upper side of the rearward end portion of said draft bar as shown in the Figure 7 and the adjacent portions of said draft bar and clip are provided with vertically aligned openings adapted to receive a securing or stop in 12 therethrough for an obvious purpose.

In order that the forward or inner end of the draft bar 3 may be connected to the motor crank casing 1 in a manner to diffuse or equalize the application of load or stress thereto, and at the same time, to lower the line of pull with relation to the center of gravity of the tractor T, I provide a substantially U-shaped coupling plate generally indicated by the numeral 13, the inner marginal portion of which is curved in a manner to conform to the curvature of the lower portion of the crank casing 1 as shown in the Figure 5, while a recess 14 is formed in its intermediate portion and is adapted to permit of the reception of the usual oil drain valve of the crank casing. Cup shaped extensions or bosses 15 are cast integral with the opposite end portions of the coupling plate 13 and have concentrically located openings formed in their respective bottom portions, through which openings, the cylindrical portions 5 of the bifurcated end portions of the draft bar 3 extend in the manner shown in the Figure 3; the outer or free portions of the cylindrical portions or shanks 5 having expansible coiled springs 16 arranged thereabout, the inner extremities of which are received and seated in the cup shaped bosses 15. Washers having reduced circular extensions upon their inner sides as indicated by the numeral 17 are engaged over the screw threaded extremities 6 of the cylindrical shanks 5, the reduced inner extensions engaging in the outer convolutions of said expansible coiled springs 16, while the washers, in turn, are locked into engagement with the adjacent convolutions of the coiled springs 16 through the medium of locking nuts 18 turned into engagement with the screw threaded extremities 6 and obviously, capable of being adjusted longitudinally of the cylindrical shanks 5 in order that the tension of the springs 16 may be adjusted or varied, such as conditions or preference may dictate.

Bolts generally indicated by the numeral 19 are passed through suitable openings formed in the body or web portion of the coupling plate 13 and in turn, are passed through the adjacent portions of the rear connecting flange of the motor crank casing 1, which as will be noted, abuts a corresponding flange formed on the forward end of the transmission casing 2. In this way, positive connection as between said coupling plate and the motor crank casing will be afforded, and hence, the line of draft through the bar 3 to the tractor T will be materially lowered with respect to the center of gravity of the same. In consequence, the wheels of the tractor will be maintained in positive engagement with a surface over which they are travelling at all times, and hence, the tractive qualities or efficiency of the tractor will be materially enhanced thereby.

Furthermore, due to the peculiar formation of the inner end of the draft bar 3 and its connection with the coupling plate 13, it will be appreciated that the load or stress directed onto said bar 3 will be evenly directed to the motor crank casing 1 and therefore, will be evenly diffused throughout the same and those of the tractor connected to it. Also, because of the fact that the draft bar 3 is regular or straight throughout, it will be understood that a direct line of pull will occur between its opposite ends as well as between the load connected to the rearward end thereof and to that point of a motor crank casing to which the forward end is connected.

Manifestly, the construction shown is capable of considerable modification and such modification as is within the scope of my claims, I consider within the spirit of my invention.

I claim:

1. A draft connection for a tractor, comprising a longitudinally disposed draft bar positioned beneath and in proximity to the transmission and motor crank casings of the tractor, a coupling plate adapted to be connected to a portion of the crank case, cupped extensions formed integral with one side of said coupling plate having concentrically located openings in their respective bottom portions, the inner end of said draft bar being bifurcated and having the extremities thereof formed cylindrical and slidably engaged through the openings in the bottoms of the cupped extensions, spring means received in said cupped extensions and receiving the outer portions of the cylindrical extremities of the bifurcated inner end of the draft bar therein having connection with the same at their outer ends.

2. In combination with a tractor, a draft bar disposed longitudinally of the under side of the transmission and motor crank casings, said casings having their adjacent ends flanged and inter-connected, a coupling plate having its inner marginal portion curved to conform to the curvature of the adjacent portion of the under side of the motor crank casing arranged adjacent its flanged end and connected thereto, cupped extensions formed integral with one side of said coupling plate having concentrically located openings in their respective bottom portions, the inner end of said draft bar being bifurcated and having cylindrical shank portions formed on the several portions thereof, said shank portions passing through the openings in the bottoms of the cupped extensions and through the latter, coiled springs received in said cupped extensions and engaged about said cylindrical shank portions, washers movably engaged over the extremities of said cylindrical shank portions, and adjustable means engaged with the extremities of said shank portions and engaging said washers for varying the extent of engagement with the adjacent ends of said coiled springs.

3. In combination with a tractor, a draft bar disposed longitudinally of the under side of the transmission and motor crank casings thereof, the adjacent ends of said casings being flanged and inter-connected, a substantially U-shaped coupling plate having the inner marginal portion thereof curved to conform to the curvature of the adjacent portion of said crank casing engaging the latter and being connected to its flanged end, cupped extensions cast integral with one side of said coupling plate having concentrically located openings in their respective bottom portions, the inner end portion of said draft bar being bifurcated and having cylindrical shank portions formed on the ends of its respective portions, said cylindrical shanks passing through the openings in the bottom portions of said cupped extensions and through said extensions, expansible coiled springs seated in the cupped extensions and engaged about portions of said cylindrical shanks, washers movably engaged over the outer ends of said cylindrical shanks and engaging said coiled springs, and means adjustable on the outer extremities of said cylindrical shanks engageable with said washers for varying their engagement with the coiled springs.

4. In combination with a tractor, a draft bar disposed longitudinally of the under side of the transmission and motor crank casings thereof, said casings having their adjacent ends flanged and inter-connected, a coupling plate arranged adjacent the under side of one end of said crank casing having its inner marginal curved to conform to the curvature of said adjacent portion of the crank casing, means for connecting said coupling plate to the flanged end of the motor crank casing, cupped extensions formed integral with one side of said coupling plate having concentrically located openings formed in their respective bottom portions, the inner end of said draft bar being bifurcated and having its extremity formed substantially cylindrical and slidably engaged through the opening in the respective bottom portions of said cupped extensions, spring means received in said cupped extensions and engaged about portions of said cylindrical shanks, means adjustable on the free end of said cylindrical shanks and engageable with said spring means for varying their tension, a substantially U-shaped bracket connected to a portion of the tractor frame receiving and movably supporting the rearward portion of said draft bar, and a stop plate disposed transversely of the under side of the rearward portion of said draft bar and arranged adjacent the rearward marginal portion of said substantially U-shaped bracket.

In witness whereof I have hereunto set my hand.

CLARENCE O. DEEMS.